US009678851B2

(12) United States Patent
Cardona et al.

(10) Patent No.: US 9,678,851 B2
(45) Date of Patent: Jun. 13, 2017

(54) CONTINUOUS MONITORING AND ANALYSIS OF SOFTWARE EVENTS

(71) Applicant: International Business Machines Corporation, Armonk, NY (US)

(72) Inventors: Omar Cardona, Cedar Park, TX (US); Michael Paul Vageline, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 14/053,409

(22) Filed: Oct. 14, 2013

(65) Prior Publication Data

US 2015/0106789 A1 Apr. 16, 2015

(51) Int. Cl.
*G06F 9/44* (2006.01)
*G06F 11/34* (2006.01)

(52) U.S. Cl.
CPC ...... *G06F 11/3466* (2013.01); *G06F 2201/86* (2013.01); *G06F 2201/865* (2013.01)

(58) Field of Classification Search
CPC .................................................. G06F 11/3466
USPC ...................................................... 717/127
See application file for complete search history.

(56) References Cited

U.S. PATENT DOCUMENTS

| 6,253,151 | B1* | 6/2001 | Ohler et al. ................... 701/409 |
| 7,689,974 | B1* | 3/2010 | Pavlyushchik ............... 717/128 |
| 8,201,027 | B2 | 6/2012 | Attinella et al. |
| 8,276,126 | B2 | 9/2012 | Farnham et al. |
| 2006/0174229 | A1 | 8/2006 | Muser |
| 2006/0248165 | A1* | 11/2006 | Sridhar et al. ................ 709/218 |
| 2007/0258553 | A1* | 11/2007 | Bloebaum et al. ........... 375/358 |
| 2010/0023700 | A1* | 1/2010 | Chen et al. .................... 711/135 |
| 2011/0289485 | A1* | 11/2011 | Mejdrich et al. ............. 717/128 |
| 2014/0331211 | A1* | 11/2014 | Ma ....................... G06F 11/3688 717/131 |

* cited by examiner

*Primary Examiner* — Li B Zhen
*Assistant Examiner* — Bradford Wheaton
(74) *Attorney, Agent, or Firm* — Garg Law Firm, PLLC; Rakesh Garg; Tomas Tyson

(57) ABSTRACT

A set of entry blocks is allocated. An entry block is configured with a set of monitoring attributes to store monitoring data corresponding to a monitoring request. The entry block is updated with an identifier supplied in the monitoring request. The entry block is used to store the monitoring data responsive to the monitoring request. The monitoring data comprises a continuous record of data changes at a requested location in memory from a beginning to an end a of an event corresponding to the monitoring request. A size of the monitoring data is distinct from another size of another monitoring data stored in another entry block in the set of entry blocks responsive to another monitoring request. An operation specified in the monitoring request is performed on a part of the monitoring data accessible from a monitoring attribute in the set of monitoring attributes of the entry block.

20 Claims, 6 Drawing Sheets

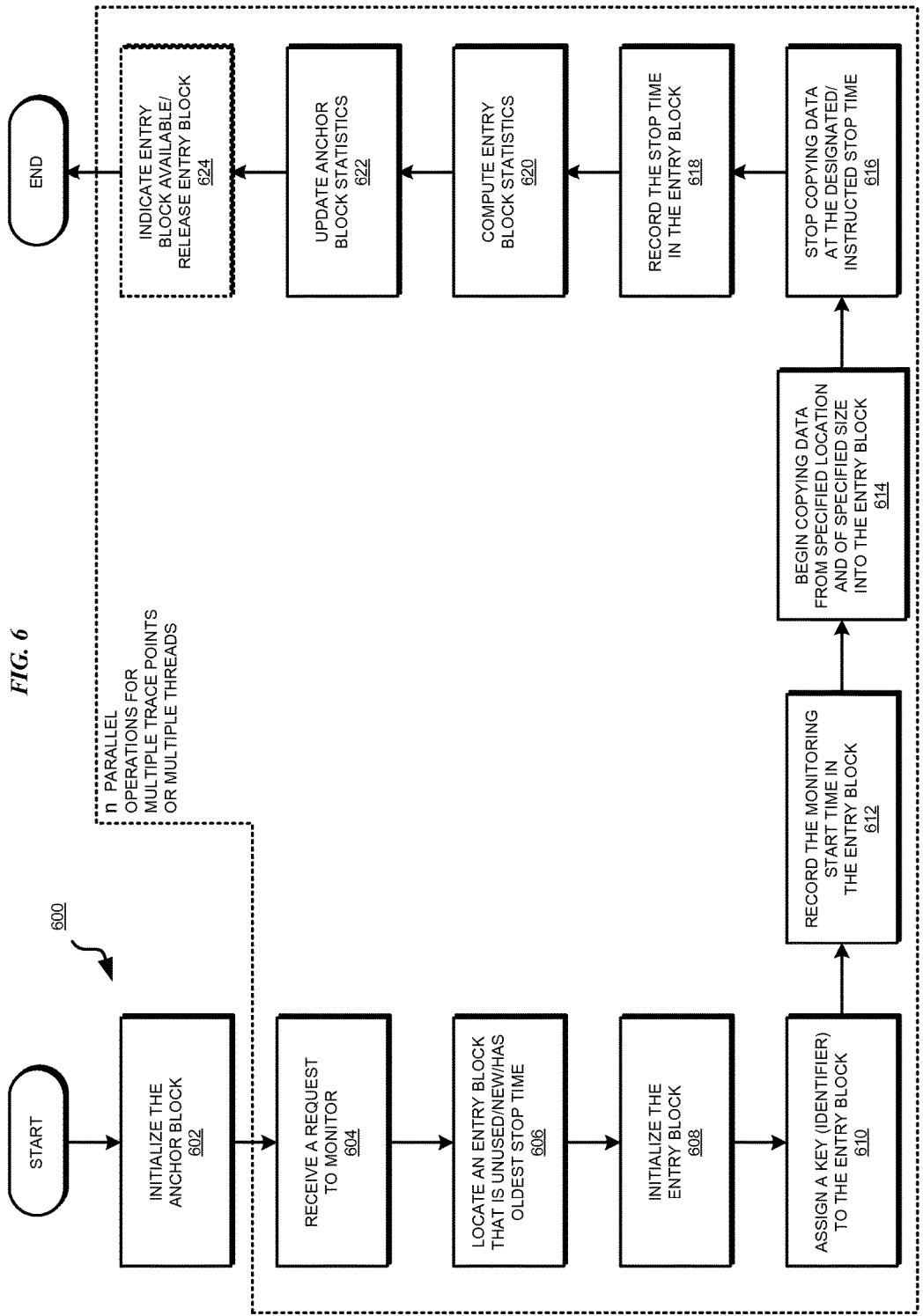

CONTINUOUS MONITORING AND ANALYSIS OF SOFTWARE EVENTS

TECHNICAL FIELD

The present invention relates generally to a method, system, and computer program product for improving monitoring software during execution. More particularly, the present invention relates to a method, system, and computer program product for continuous monitoring and analysis of software events.

BACKGROUND

When a software program executes, the execution has to be monitored for a variety of reasons. For example, software execution may have to be monitored to determine a performance metric associated with an executing process, investigate an error, or troubleshoot a feature. Maintenance and tuning of the data processing system for certain types of workloads is another reason for monitoring software execution.

SUMMARY

The illustrative embodiments provide a method, system, and computer program product for continuous monitoring and analysis of software events. An embodiment allocates a set of entry blocks, an entry block in the set of entry blocks configured with a set of monitoring attributes to store monitoring data corresponding to a monitoring request. The embodiment updates the entry block with an identifier supplied in the monitoring request. The embodiment uses the entry block to store the monitoring data responsive to the monitoring request, wherein the monitoring data comprises a continuous record of data changes at a requested location in memory from a time of beginning of an event to a time of ending of the event corresponding to the monitoring request, and wherein a size of the monitoring data is distinct from another size of another monitoring data stored in another entry block in the set of entry blocks responsive to another monitoring request. The embodiment performs, using a processor, an operation specified in the monitoring request on a part of the monitoring data accessible from a monitoring attribute in the set of monitoring attributes of the entry block.

Another embodiment includes a computer usable storage device including computer usable code for continuous monitoring and analysis of software events. The embodiment further includes computer usable code for allocating a set of entry blocks, an entry block in the set of entry blocks configured with a set of monitoring attributes to store monitoring data corresponding to a monitoring request. The embodiment further includes computer usable code for updating the entry block with an identifier supplied in the monitoring request. The embodiment further includes computer usable code for using the entry block to store the monitoring data responsive to the monitoring request, wherein the monitoring data comprises a continuous record of data changes at a requested location in memory from a time of beginning of an event to a time of ending of the event corresponding to the monitoring request, and wherein a size of the monitoring data is distinct from another size of another monitoring data stored in another entry block in the set of entry blocks responsive to another monitoring request. The embodiment further includes computer usable code for performing, using a processor, an operation specified in the monitoring request on a part of the monitoring data accessible from a monitoring attribute in the set of monitoring attributes of the entry block.

Another embodiment includes a storage device including a storage medium, wherein the storage device stores computer usable program code. The embodiment further includes a processor, wherein the processor executes the computer usable program code, and wherein the computer usable program code includes computer usable code for allocating a set of entry blocks, an entry block in the set of entry blocks configured with a set of monitoring attributes to store monitoring data corresponding to a monitoring request. The embodiment further includes computer usable code for updating the entry block with an identifier supplied in the monitoring request. The embodiment further includes computer usable code for using the entry block to store the monitoring data responsive to the monitoring request, wherein the monitoring data comprises a continuous record of data changes at a requested location in memory from a time of beginning of an event to a time of ending of the event corresponding to the monitoring request, and wherein a size of the monitoring data is distinct from another size of another monitoring data stored in another entry block in the set of entry blocks responsive to another monitoring request. The embodiment further includes computer usable code for performing, using a processor, an operation specified in the monitoring request on a part of the monitoring data accessible from a monitoring attribute in the set of monitoring attributes of the entry block.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of an example process for continuous monitoring and analysis of software events in accordance with an illustrative embodiment.

DETAILED DESCRIPTION

Figure 1:
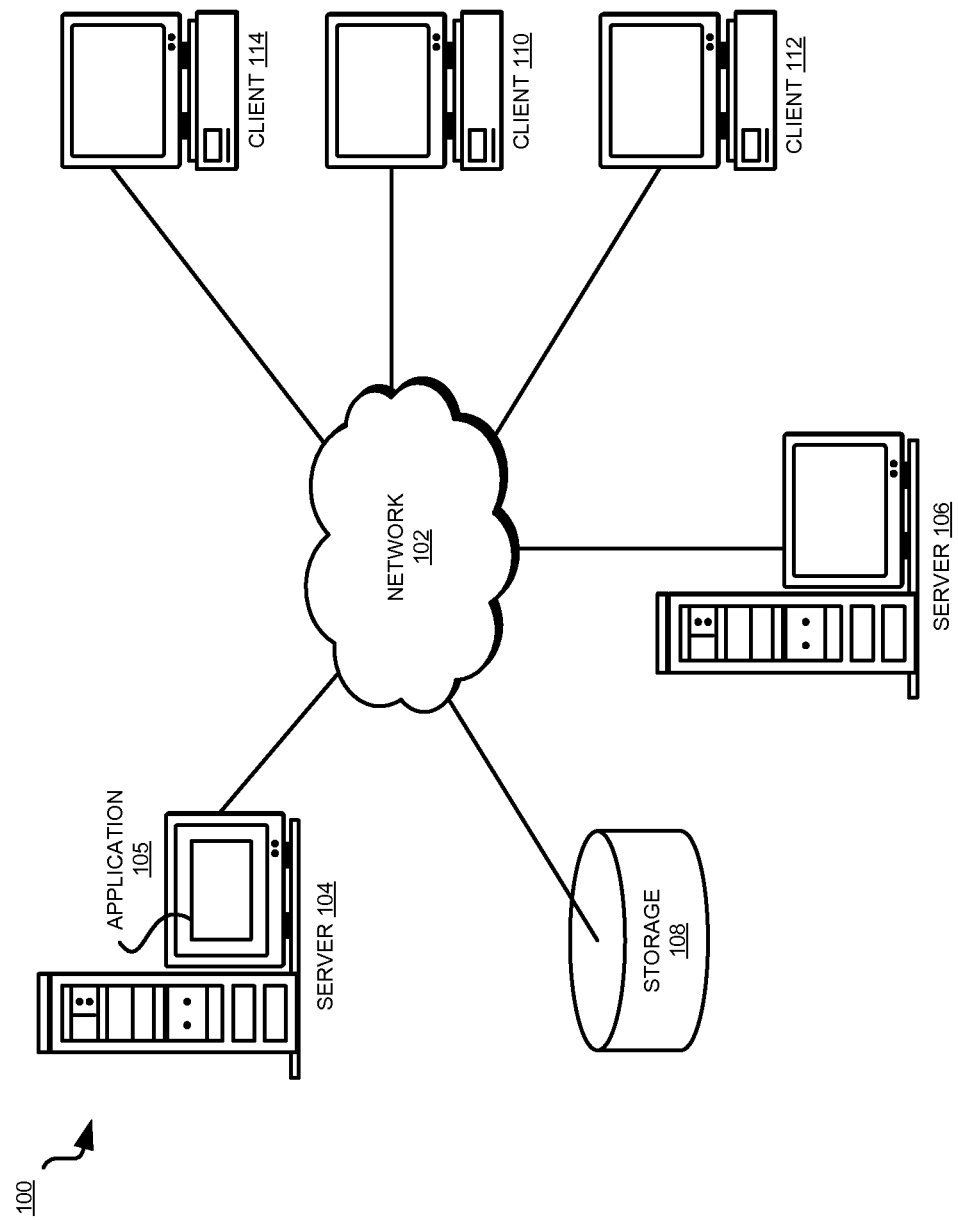
FIG. 1 depicts a block diagram of a network of data processing systems in which illustrative embodiments may be implemented.

Presently, some tools are available for monitoring executing software for performance, maintenance, analytical, and troubleshooting reasons. For example, system trace is an existing method used for monitoring software execution.

System dump, or core dump, is another method for capturing data generated from software execution. Other specialized tools for similar purposes are purpose-built for monitoring specific combinations of hardware and software. Another approach by software developers to collect performance and trouble data is by embedding custom monitoring code, which is designed specifically for monitoring specific aspects of proprietary software, into the software itself.

The illustrative embodiments recognize that presently available tools and techniques for monitoring software execution in a data processing system suffer from several drawbacks. For example, system trace is a shared tool that relies on a very small shared memory space for recording trace data. A trace word memory is locked for use with one thread while running a trace on that thread. A thread is a unit of execution comprising one or more instructions that are scheduled together by a data processing system scheduler for execution by a processor.

Trace can be associated with, and can operate on only one thread at a time. For tracing an operation in another thread of execution, the trace word has to be released from the first thread, associated with the other thread, and the trace word space is then overwritten with data from the other thread. Thus, the illustrative embodiments recognize that the system trace is significantly limited by the memory space available for tracing, and cannot be used simultaneously with multiple threads in a multithreaded data processing system.

Furthermore, the illustrative embodiments recognize that some aspects of monitoring a program's execution need cumulative data over several iterations of executing a portion of the code. The illustrative embodiments recognize that the trace operation does not cumulate data from one iteration of executing a section of code to the next iteration of the execution of the same code. External tooling for cumulating data with system trace has to be custom built, and still fails to overcome other shortcomings of system trace.

The illustrative embodiments recognize that system dump is also unsuitable for monitoring execution of software. For example, the illustrative embodiments recognize that system dump comprise a snapshot view of the entire memory space available to the operating system. Furthermore, system dump is not a repetitive or continuous process that can be used for active monitoring of software during execution. In other words, the dump operation is a one-time collective view of memory and cannot be used selectively with sufficient granularity to continuously monitor data of a program, process, or thread.

The illustrative embodiments further recognize that custom monitoring code built into proprietary software are generally inaccessible and unusable for any execution other than an execution of the software in which they are built. Purpose-built monitors for hardware-software combinations suffer from a similar restrictive disadvantage.

The illustrative embodiments used to describe the invention generally address and solve the above-described problems and other problems related to monitoring software execution. The illustrative embodiments provide a method, system, and computer program product for continuous monitoring and analysis of software events.

An embodiment creates a monitoring data structure that can be created on demand for threads that require the monitoring function of the embodiment. The data structure enables monitoring the data related to any number of events within one or more threads simultaneously.

Furthermore, an embodiment allows flexible configuration of each monitoring according to the monitoring need. For example, using an embodiment, a user can specify one size of data in memory to monitor for one thread and another size of data in memory to monitor for another thread. As another example, using an embodiment, a user can specify different monitoring durations for monitoring different events within a single thread or across several threads.

An embodiment further provides on-the-fly analytics of the collected monitoring data. For example, together with the monitoring data, the embodiment can provide per-iteration analysis of the time taken to monitor the same section of code in different iterations. Furthermore, an embodiment can also cumulate analytics over all or a subset of the monitoring activity, such as over a number of iterations of a section of code, or even different events in different threads under certain circumstances.

The illustrative embodiments are described with respect to, certain data structures, events, analyses, statistics, methodologies, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
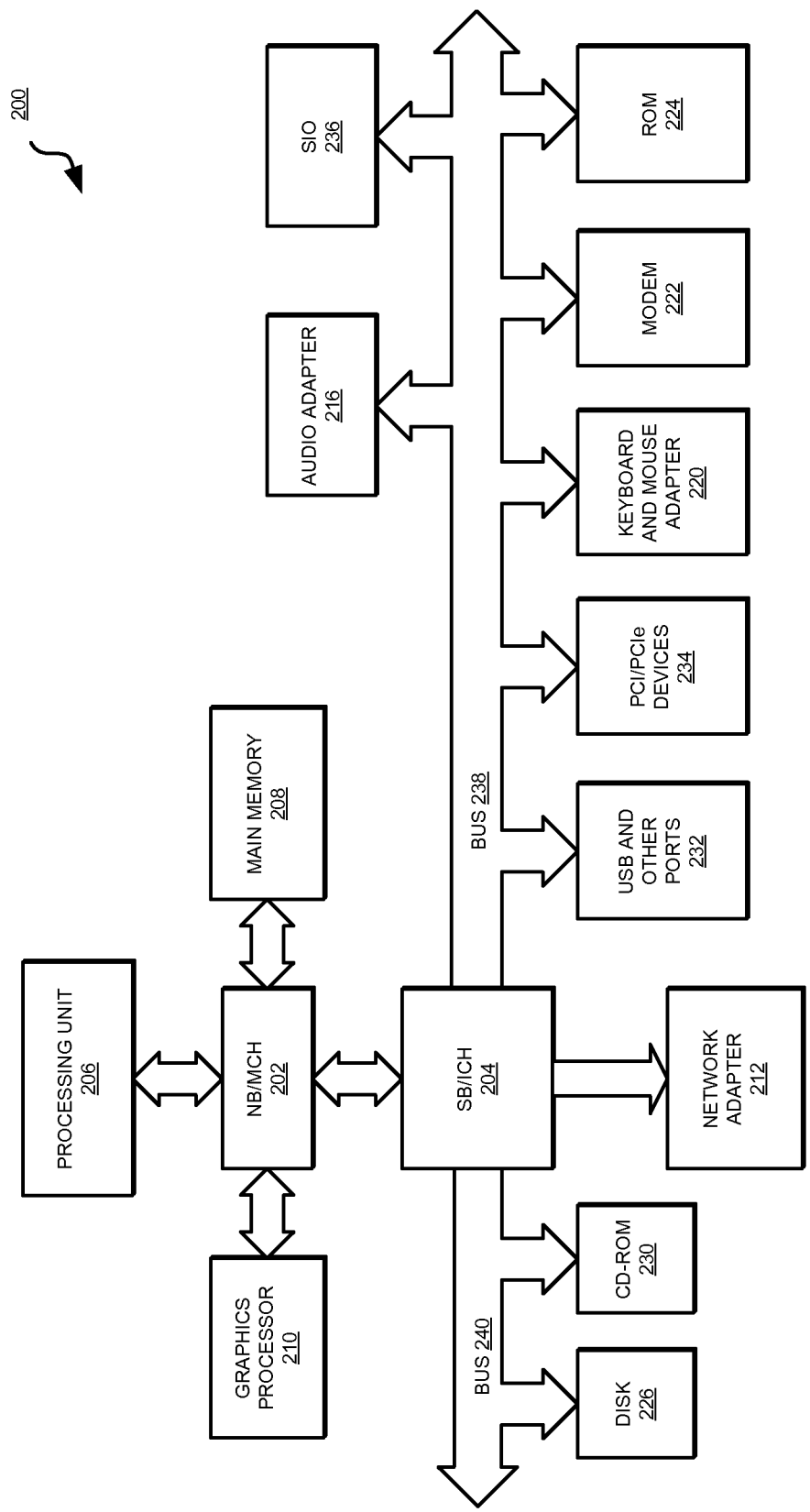
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Application 105 implements an embodiment described herein.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
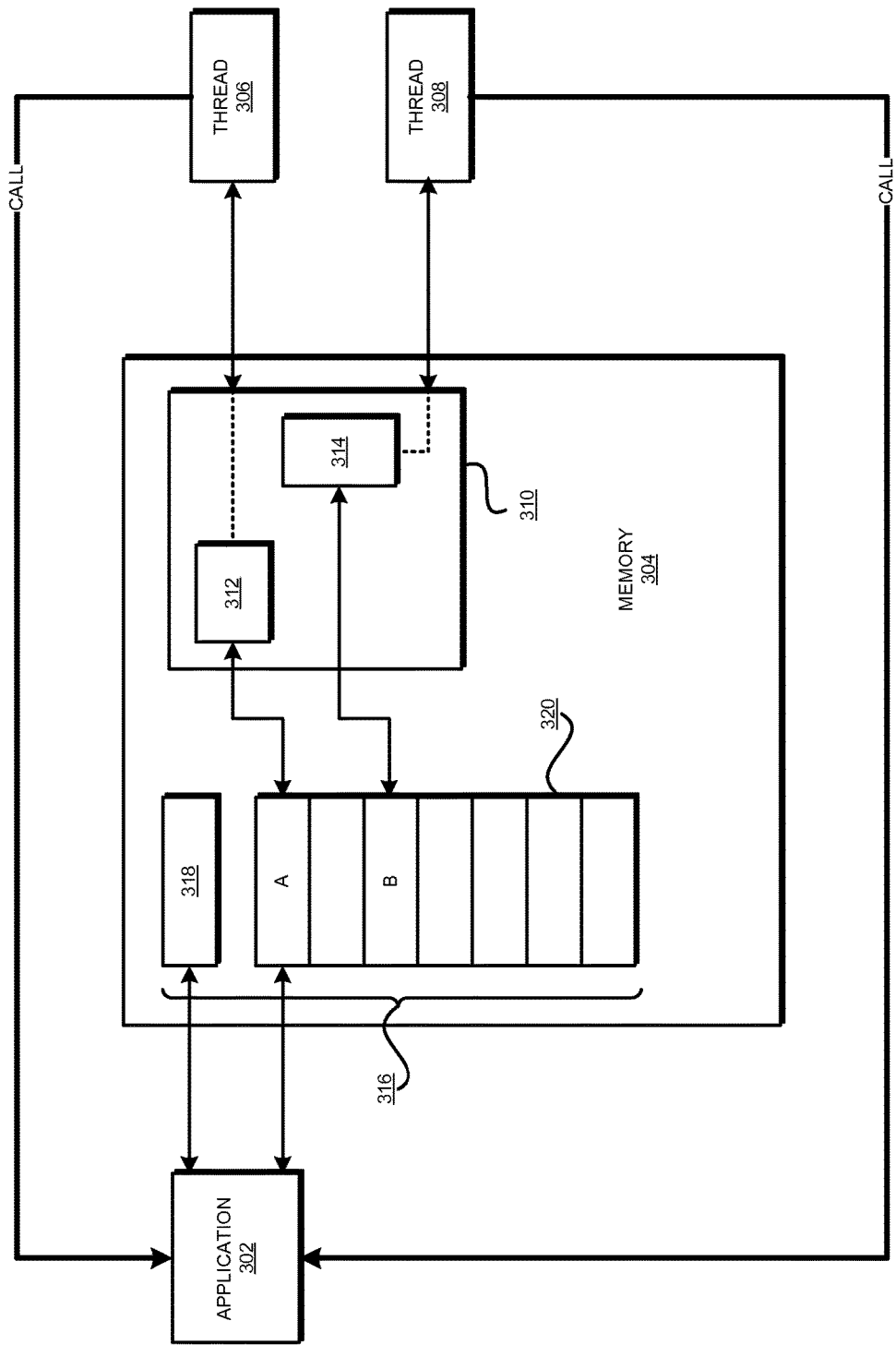
FIG. 3 depicts a block diagram of a configuration for continuous monitoring and analysis of software events in accordance with an illustrative embodiment.

With reference to FIG. 3, this figure depicts a block diagram of a configuration for continuous monitoring and analysis of software events in accordance with an illustrative embodiment. Application 302 is an example of application 105 in FIG. 1. Memory 304 is an example of memory 208 in FIG. 2. Threads 306 and 308 execute using processor 206 and memory 208 of FIG. 2, such as in server 104 in FIG. 1.

Only for the purposes of clear description of the illustration and without implying any limitations on the illustrative embodiments thereto, assume that in an example operation of an embodiment threads 306 and 308 use the same area of memory 304, to wit, address space 310. Within address space 310, assume that a user or a software application has to monitor the data being manipulated in area 312 during the execution of thread 306. Similarly, assume that a user or a software application has to monitor the data being manipulated in area 314 during the execution of thread 308.

Areas 312 and 314 may be populated in any suitable manner by threads 306 and 308. For example, thread 306 may maintain an object instance or a set of register values in area 312, and thread 308 may maintain a set of flags or a set of global or local data structures in area 314.

Again for the clarity of the description, in the example operation, assume that only one example iteration of a code section execution in each thread is being monitored for only one example event. For monitoring thread 306's event, a user, a software application, or a configuration of thread 306 invokes application 302, such as by calling an application programming interface (API) of application 302.

Application 302 allocates space in memory 304 to instantiate data structure 316. Data structure 316 includes at least two components, block 318 and set of blocks 320. Block 318 is referred to hereinafter as an anchor block. Set of blocks 320 includes one or more blocks of same or different sizes, each block within set of blocks 320 being referred to hereinafter as an entry block.

Application 302 associates entry block A in set of blocks 320 with the monitoring of area 312. Application 302 associates entry block B with the monitoring of area 314.

In one embodiment, a user, a software application, or a configuration of a thread, for example, of thread 306, requests monitoring by calling the API of application 302 with a set of parameters to describe the subject of the monitoring. An example set of parameters includes an address at which to begin the monitoring, a length of data from that address to be monitored, an identifier (key) to associate with the monitoring activity, and a set of analytics and other operations to perform with the monitoring data.

In one embodiment, the key or a derivative thereof is associated with an entry block that is used for monitoring according to a request. Identification of entry blocks in this manner is useful in distinguishing one entry block from another when several entry blocks may be in use simultaneously for monitoring different events occurring in one or more threads.

A request can specify any number of operations. For example, a request can specify a need for time summarization, to wit, computing an amount of time taken for the event to occur during the monitoring. In one embodiment, the request can specify an operation by simply naming the operation as a parameter. In another embodiment, the request can provide as a parameter a reference to a function to invoke. The number and nature of operations associable with the monitoring data is not limited by any example descriptions herein. For example, one user or software application may want to perform statistical analysis of one kind on the monitoring data, whereas another user or application may want to perform a memory allocation efficiency or leak analysis with the monitoring data.

In one embodiment, default values for certain parameters can be used if the user, the software application, or the configuration does not provide a specific parameter. For example, an identifier can be auto-generated in application 302 if the identifier parameter is not provided. Similarly, a default length of data can be monitored if the data length parameter is not provided.

In one embodiment, application 302 can allocate space for data structure 316 in another memory, as different from memory 304 used by threads 304 and 306. Furthermore, in one embodiment, data structure 316 is created in the user space area of a given memory, such as when a thread of a user application software program is to be monitored. In another embodiment, data structure 316 is created in the kernel space of a given memory, such as when a thread of an operating system kernel component is to be monitored.

Threads 306 and 308 or other threads can be configured to use different address spaces within the scope of the illustrative embodiments. Furthermore, any number of iterations of any number of code sections in any number of threads can be monitored for any number of events in a similar manner within the scope of the illustrative embodiments.

In one embodiment, a software program calling the API of application 302 causes application 302 to allocate and initialize anchor block 318. The software program calls the same or different API of application 302, with the key and other suitable parameters to begin a tracing or monitoring activity. The software program calls the same or different API of application 302, with the key and other suitable parameters to end a tracing or monitoring activity. The beginning and ending calls with the same key form the compete tracing of an event. Different threads can call the API with different keys to begin and end different tracings on different events. Furthermore, the software program can make any number of beginning and ending calls with any number of keys to monitor any number of events.

Additionally, at the end of a monitoring activity, an embodiment copies the data from the entry block used for that particular monitoring activity to another location for safekeeping or future use. An embodiment further analyzes the data, for example, to compute time statistics of the monitored event, and updates anchor block 318 as described with respect to FIG. 4.

An embodiment further performs post-analysis of the set of entry blocks to determine whether some entry blocks are available for reuse or release. In one embodiment, the post-analysis function is specified at the initialization of anchor block 318. In another embodiment, the post-analysis function is a default function.

In one embodiment, each entry block in set 320 is of a fixed size. In another embodiment, various entry blocks in set 320 can be of different specified sizes. In another embodiment, an entry block in set 320 can be of variable size.

In some entry blocks, for example, when an entry block is of variable size, metadata in the entry block describes the monitoring data saved therein, including but not limited to describing a size and location of the monitoring data. Some other examples of metadata describing the monitoring data include a header with entry block statistics and statistics of other related entry blocks, such as when several entry blocks are to be considered together for an analysis.

When each entry block has to be of a fixed or common size, one embodiment determines that fixed or common size from the sizes saved in anchor block 318, or from an initialization API call parameter.

Figure 4:
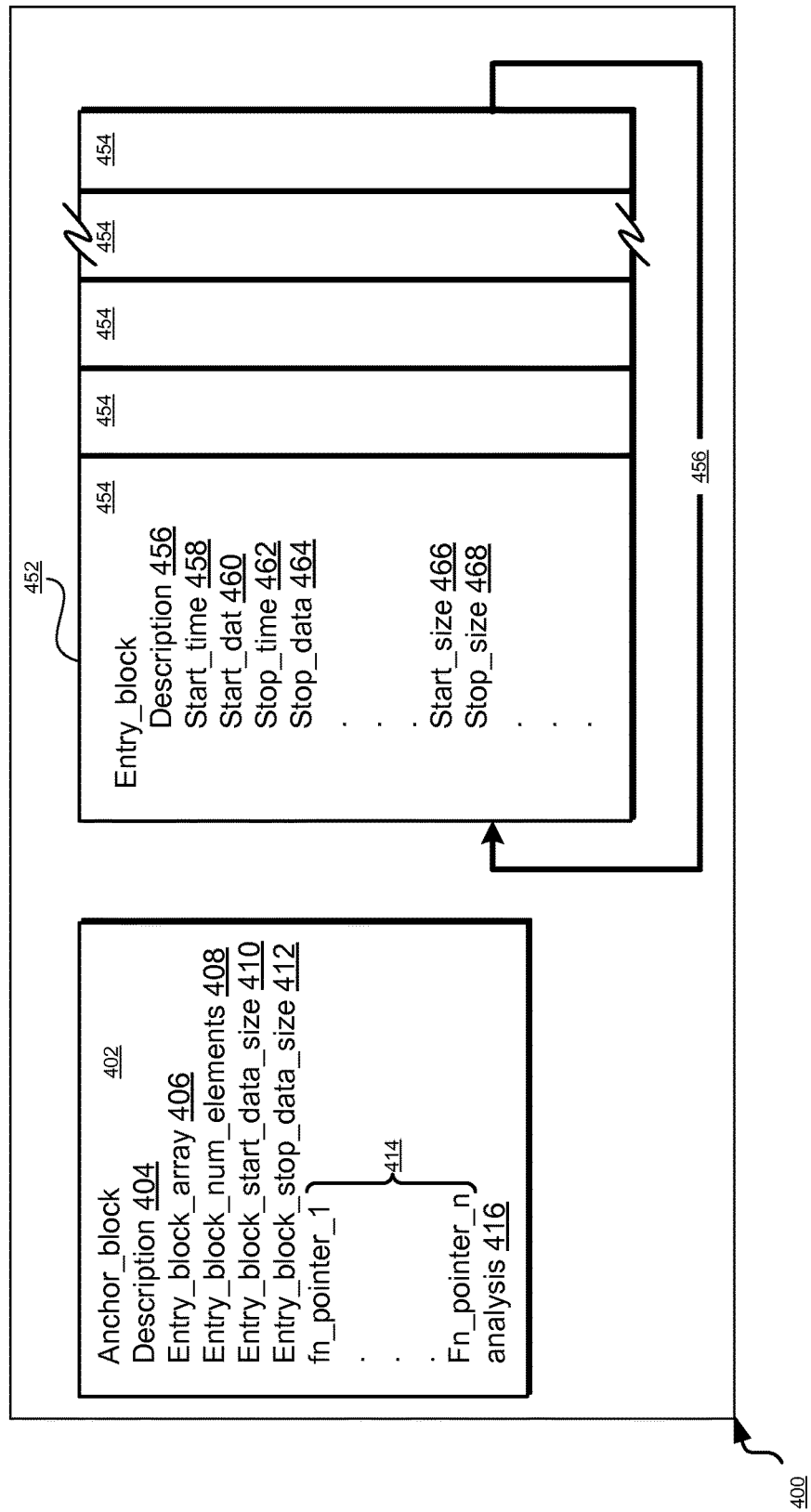
FIG. 4 depicts a block diagram of an example configuration of a data structure usable for continuous monitoring and analysis of software events in accordance with an illustrative embodiment.

With reference to FIG. 4, this figure depicts a block diagram of an example configuration of a data structure usable for continuous monitoring and analysis of software events in accordance with an illustrative embodiment. Data structure 400 is an example of data structure 316 in FIG. 3. Anchor block 402 in data structure 400 corresponds to anchor block 318 in data structure 316 in FIG. 3. Set of entry blocks 452 in data structure 400 corresponds to set of entry blocks 320 in data structure 316 in FIG. 3.

In one embodiment, anchor block 402 includes attribute 404 for describing or uniquely identifying data structure 400 in a given data processing environment where multiple data structures similar to 400 may be co-existing.

Attribute 406 identifies where set of entry blocks 452 associated with anchor block 402 is located. Attribute 408 reflects the present number of entry blocks in set of entry blocks 452.

One embodiment allocates an initial number of entry blocks 454 in set 452 and configures the allocated entry blocks in a ring buffer configuration, as indicated by pointer 456. In a ring buffer configuration, the total allocation for set 452 remains unchanged, and already allocated existing entry blocks 454 are overwritten when needed.

Another embodiment allocates an initial number of entry blocks 454 in set 452. The number of allocated entry blocks can change depending on the demand on the monitoring application, e.g., on application 302 in FIG. 3. For example, when all entry blocks 454 are in use for active monitoring, an embodiment allocates one or more additional entry blocks when a new request for monitoring is received. Conversely, an embodiment can also free one or more allocated entry blocks 454 when monitoring demand can be accommodated in fewer than the number of then-allocated entry blocks 454.

In order to allocate entry blocks 454 in a fixed-size entry block embodiment, the embodiment has to determine the size of entry blocks 454. One embodiment computes the size of entry block 454 by adding a size of the monitoring data, the size of the data saved at start of the monitoring (entry block start data size 410), and the size of the data saved at the end of the monitoring (entry block stop data 412).

A user or a software program, such as a software program calling the API of application 302 in FIG. 3, can specify any number of functions 414 that the user or the program wants to apply to the monitoring data. Functions 414 are references to any number of corresponding operations that can be applied on the monitoring data. In one embodiment, functions 414 are pointers to the functions where these operations can be performed. In an example embodiment, function 414 include, but are not limited to, a combination of initializing a monitoring operation, starting a monitoring operation, stopping a monitoring operation, outputting all or some of the contents of one or more entry blocks 454, performing a post-analysis of the monitoring data, analyzing the monitoring data, moving the monitoring data to another data storage device or area, clearing set 452 of entry blocks, and destroying data structure 400.

For example, the initializing function allocates the space for set 452 or one or more entry blocks 454 depending upon the parameters of the function. As another example, the clearing function resets some or all contents of some or all entry blocks 454 to null value depending on the parameters of the function.

In one embodiment, an entry block in set 452, such as entry block 454, includes attribute 456 for describing or uniquely identifying entry block 454 in set 452. For example, attribute 456 can be populated with the key described earlier. In one embodiment, attribute 456 is optional, such as when entry block 454 is reachable and uniquely identifiable in another manner, such as when entry block 454 occupies a specific location in a list or tree data structure.

Attribute 458 identifies when the monitoring associated with entry block 454 starts. Attribute 460 points to where the beginning of the monitored data is stored in entry block 454. Attribute 462 identifies when the monitoring associated with entry block 454 stops. Attribute 464 points to where the end of the monitored data is stored in entry block 454.

Entry block 454 can be used for monitoring not only the time of monitoring, time consumed by a monitored event or operation, but also other aspects of the monitored memory space. For example, a user or a software application may be interested in determining how a thread allocates and releases memory around an event. Additional attributes in entry block 454 can be configured to support this and other monitoring objectives. For example, attribute 466 can be configured to store a starting size of allocated memory before a monitored event occurs and attribute 468 can be configured to store an ending size of allocated memory after the monitored event has occurred. Any number of attributes 466 and 468 can similarly be created in entry block 454 within the scope of the illustrative embodiments.

Attributes in entry block 454 participate in one or more computations, analyses, or operations relevant to the monitoring objective. For example, a subtraction operation using the values of attribute 458 and 462 can provide insight into a time consumed by the monitored event. As different events are monitored using different instances of entry blocks 454 in set 452, different times can be computed in this manner. A user or a software application may be interested in average time, maximum time, minimum time, and other statistical analyses of event times across set 452 or a subset thereof.

In one embodiment, set-wide analysis results of this and other types can be stored in attribute 416 in anchor block 402. Any number of attribute 416 can be configured in anchor block 402 to store any number of set-wide analytical, statistical, and other results performed on the contents of entry blocks in set 452.

Figure 5:
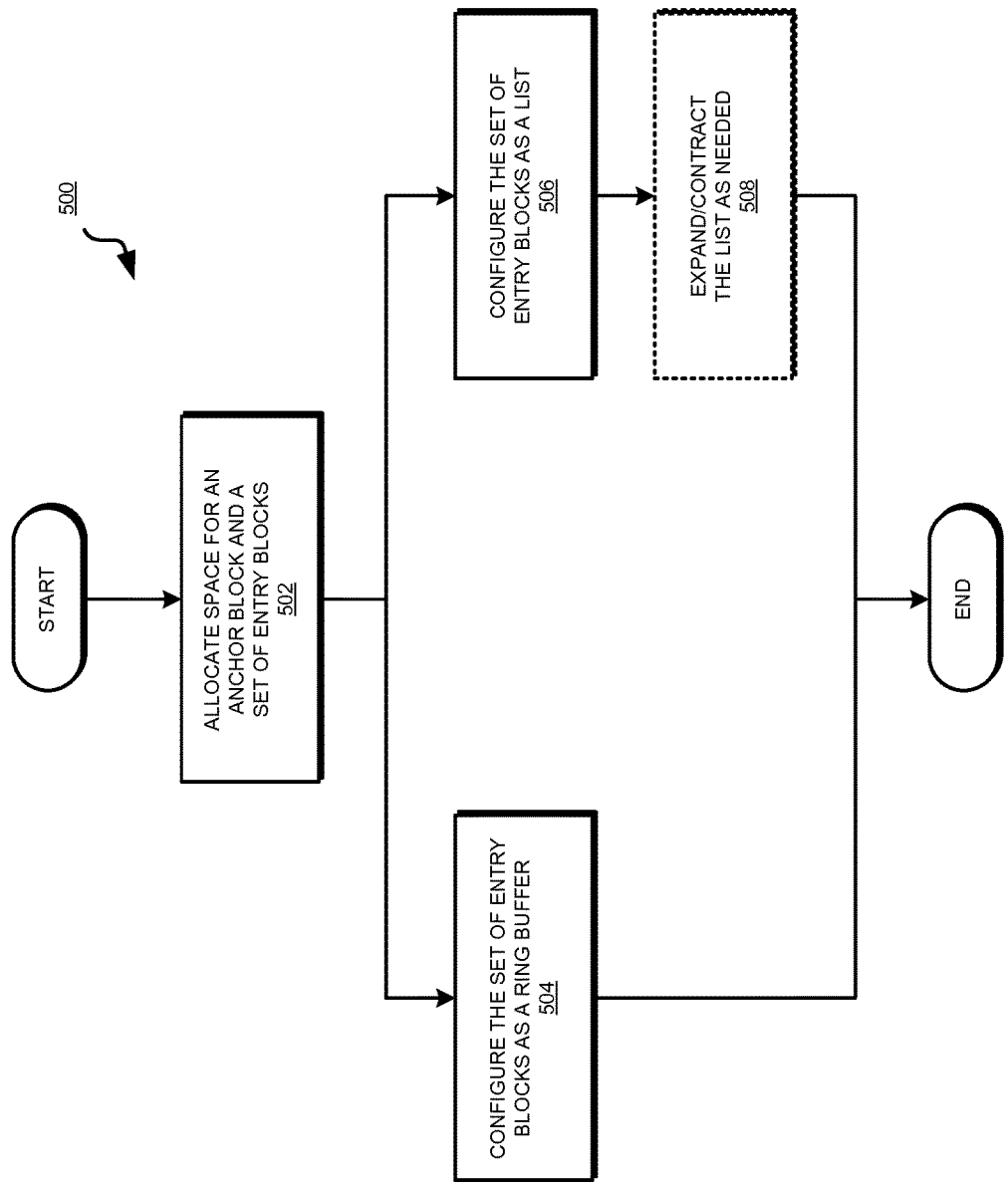
FIG. 5 depicts a flowchart of an example process of configuring a memory for continuous monitoring and analysis of software events in accordance with an illustrative embodiment.

With reference to FIG. 5, this figure depicts a flowchart of an example process of configuring a memory for continuous monitoring and analysis of software events in accordance with an illustrative embodiment. Process 500 can be implemented in application 302 in FIG. 3.

The application begins process 500 by allocating space for an anchor block and a set of entry blocks (block 502). In one embodiment, the application configures the set of entry blocks as a ring buffer (block 504). The application ends process 500 thereafter, or proceeds to enter process 600 described with respect to FIG. 6.

In another embodiment, the application configures the set of entry blocks as a list (block 506). Optionally, the application can also adjust a size of an existing set of entry blocks by adding new entry blocks or releasing unused entry blocks from the list (block 508). The application ends process 500 thereafter, or proceeds to enter process 600 described with respect to FIG. 6.

With reference to FIG. 6, this figure depicts a flowchart of an example process for continuous monitoring and analysis of software events in accordance with an illustrative embodiment. Process 600 can be implemented in application 302 in FIG. 3.

The application begins process 600, or enters process 600 following process 500 of FIG. 5. The application initializes the anchor block (block 602). The application receives a request to monitor, for example, an event in a thread (block 604). The application locates an entry block that is not used in any active monitoring, has been newly created, or is the oldest used entry block (block 606). For example, the application can select the oldest entry block in a ring buffer configuration of set 452 by finding the entry block that has the oldest stop time value in attribute 462 in FIG. 4.

The application initializes the located entry block (block 608). The application assigns a key or identifier to the entry block to associate the entry block with the requested monitoring activity (block 610). The application records the monitoring start time in the initialized entry block, such as in attribute 458 of FIG. 4 (block 612).

The application begins copying the monitored data from the location and size of memory specified in the request into the entry block (block 614). The application stops copying the data at the designated or instructed stop time (block 616). For example, a designated stop time is when a monitored event has occurred, and an instructed stop time is a stop time specified in a monitoring request. The application records the stop time in the entry block, such as using attribute 462 in FIG. 4, (block 618).

The application computes, or performs, any statistical or other analysis of the contents of the entry block (block 620). Some examples of such computations are described earlier in this disclosure. Those of ordinary skill in the art will be able to conceive from this disclosure other computations that can be performed using the contents of an entry block in a similar manner and the same are contemplated within the scope of the illustrative embodiments.

In one embodiment, the application further performs a computation using data from one or more entry blocks in the set of entry blocks and updates an attribute in the anchor block with set-wide analysis results, such as using attribute 416 in FIG. 4, (block 622). Once the request has been satisfied, the application can optionally indicate the entry block as available for another request (block 624). In another embodiment, the application may release the entry block in block 624.

The application ends process 600 thereafter. Note that the operation of process 600 has been described with respect to one request for one event monitoring only as an example and not to imply any limitation on the illustrative embodiments. The illustrative embodiments contemplate that any number of parallel operations of process 600 is possible given several concurrently pending monitoring requests for several events in one or more threads.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for continuous monitoring and analysis of software events. An embodiment continuously saves the monitored data. An embodiment can further include in the saved data the data at the beginning and the data at the end of the event of code section being monitored. Furthermore, an embodiment saves timestamps of the beginning and ending of the monitored event or code execution.

In one embodiment, a user or a software application can specify the size of the data that is saved from the monitoring for future analysis. An embodiment is configurable for use in conjunction with an existing tool, such as a debugging tool. Trace data is not lost upon completion of the monitoring activity, but can be queried or outputted from the data structure of the embodiment without disrupting the monitored thread.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device.

The terms "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for continuous monitoring and analysis of software events, the method comprising:
    allocating a set of entry blocks, an entry block in the set of entry blocks configured with a set of monitoring attributes to store monitoring data corresponding to a monitoring request;
    updating the entry block with an identifier, the identifier being specified in a portion of the monitoring request;
    using the entry block to store the monitoring data responsive to the monitoring request, wherein the monitoring data comprises a continuous record of data changes at a requested location in memory from a time of beginning of an event to a time of ending of the event corresponding to the monitoring request, and wherein a size of the monitoring data is distinct from another size of another monitoring data stored in another entry block in the set of entry blocks responsive to another monitoring request, wherein the data changes at the requested location in the memory are performed by a plurality of threads, wherein different subsets of entry blocks in the set of entry blocks record monitoring data of different threads, wherein the different subsets of entry blocks monitor different types of events from the corresponding different threads, and wherein the identifier is associated with only a particular subset of entry blocks storing monitoring data of a particular thread; and
    performing, using a processor, an operation according to a function call recorded in an anchor block, wherein the function call is specified in another portion of the monitoring request on a part of the monitoring data accessible from a monitoring attribute in the set of monitoring attributes of the entry block, and wherein the function call performs one of (i) a monitoring operation, (ii) an analysis operation on the monitoring data, and (iii) a management of an entry block.

2. The method of claim 1, further comprising:
    allocating the anchor block, the anchor block storing (i) a reference to the set of entry blocks, (ii) a set of references to a corresponding set of functions, wherein a reference to a function in the set of functions is the function call that performs the operation.

3. The method of claim 2, the anchor block further including an attribute, where the attribute in the anchor block stores a computation performed using a common monitoring attribute from a subset of the set of entry blocks.

4. The method of claim 1, wherein a first monitoring attribute in the entry block stores the time of the beginning, wherein a second monitoring attribute in the entry block stores the time of the ending, and wherein the operation is a statistical computation using the time of the beginning and the time of the ending of the event.

5. The method of claim 1, wherein the event comprises execution of a section of program code in a thread corresponding to the monitoring request in the plurality of threads.

6. The method of claim 1, further comprising:
using a second entry block to store second monitoring data responsive to the monitoring request, wherein the second monitoring data comprises data changes at the requested location in the memory from a second time of beginning of a second event to a second time of ending of the second event.

7. The method of claim 6, wherein the second event is the event occurring in a second iteration of executing a section of program code corresponding to the event.

8. The method of claim 1, further comprising:
receiving the monitoring request, wherein the monitoring request specifies a set of parameters of a monitoring activity, wherein a first parameter in the set of parameters includes an address in the memory, and a second parameter in the set of parameters includes a size of data from the address in the memory to be monitored responsive to an event.

9. The method of claim 8, wherein a third parameter in the set of parameters includes an operation to be performed on the monitoring data collected in the entry block responsive to the monitoring request.

10. The method of claim 1, wherein the set of entry blocks is configured as a list, further comprising:
allocating a new entry block responsive to a new monitoring request, wherein an entry block in the set of entry blocks is unavailable for use in monitoring responsive to the new monitoring request; and
adding the new entry block to the set of entry blocks forming a new set of entry blocks.

11. The method of claim 1, wherein the set of entry blocks is configured as a ring buffer, further comprising:
selecting an old entry block from the set of entry blocks responsive to a new monitoring request, wherein a monitoring stop time of the old entry block is the oldest in the set of entry blocks; and
storing monitoring data responsive to the new monitoring request in the old entry block.

12. A computer usable program product comprising a computer readable storage device including computer usable code for continuous monitoring and analysis of software events, the computer usable code comprising:
computer usable code for allocating a set of entry blocks, an entry block in the set of entry blocks configured with a set of monitoring attributes to store monitoring data corresponding to a monitoring request;
computer usable code for updating the entry block with an identifier, the identifier being specified in a portion of the monitoring request;
computer usable code for using the entry block to store the monitoring data responsive to the monitoring request, wherein the monitoring data comprises a continuous record of data changes at a requested location in memory from a time of beginning of an event to a time of ending of the event corresponding to the monitoring request, and wherein a size of the monitoring data is distinct from another size of another monitoring data stored in another entry block in the set of entry blocks responsive to another monitoring request, wherein the data changes at the requested location in the memory are performed by a plurality of threads, wherein different subsets of entry blocks in the set of entry blocks record monitoring data of different threads, wherein the different subsets of entry blocks monitor different types of events from the corresponding different threads, and wherein the identifier is associated with only a particular subset of entry blocks storing monitoring data of a particular thread; and
computer usable code for performing, using a processor, an operation according to a function call recorded in an anchor block, wherein the function call is specified in another portion of the monitoring request on a part of the monitoring data accessible from a monitoring attribute in the set of monitoring attributes of the entry block, and wherein the function call performs one of (i) a monitoring operation, (ii) an analysis operation on the monitoring data, and (iii) a management of an entry block.

13. The computer usable program product of claim 12, further comprising:
computer usable code for allocating the anchor block, the anchor block storing (i) a reference to the set of entry blocks, (ii) a set of references to a corresponding set of functions, wherein a reference to a function in the set of functions is the function call that performs the operation.

14. The computer usable program product of claim 13, the anchor block further including an attribute, where the attribute in the anchor block stores a computation performed using a common monitoring attribute from a subset of the set of entry blocks.

15. The computer usable program product of claim 12, wherein a first monitoring attribute in the entry block stores the time of the beginning, wherein a second monitoring attribute in the entry block stores the time of the ending, and wherein the operation is a statistical computation using the time of the beginning and the time of the ending of the event.

16. The computer usable program product of claim 12, wherein the event comprises execution of a section of program code in a thread corresponding to the monitoring request in the plurality of threads.

17. The computer usable program product of claim 12, further comprising:
computer usable code for using a second entry block to store second monitoring data responsive to the monitoring request, wherein the second monitoring data comprises data changes at the requested location in the memory from a second time of beginning of a second event to a second time of ending of the second event.

18. The computer usable program product of claim 12, wherein the computer usable code is stored in a computer readable storage device in a data processing system, and wherein the computer usable code is transferred over a network from a remote data processing system.

19. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

20. A data processing system for continuous monitoring and analysis of software events, the data processing system comprising:

a storage device, wherein the storage device stores computer usable program code; and a processor, wherein the processor executes the computer usable program code, and wherein the computer usable program code comprises:

computer usable code for allocating a set of entry blocks, an entry block in the set of entry blocks configured with a set of monitoring attributes to store monitoring data corresponding to a monitoring request;

computer usable code for updating the entry block with an identifier, the identifier being specified in a portion of the monitoring request;

computer usable code for using the entry block to store the monitoring data responsive to the monitoring request, wherein the monitoring data comprises a continuous record of data changes at a requested location in memory from a time of beginning of an event to a time of ending of the event corresponding to the monitoring request, and wherein a size of the monitoring data is distinct from another size of another monitoring data stored in another entry block in the set of entry blocks responsive to another monitoring request, wherein the data changes at the requested location in the memory are performed by a plurality of threads, wherein different subsets of entry blocks in the set of entry blocks record monitoring data of different threads, wherein the different subsets of entry blocks monitor different types of events from the corresponding different threads, and wherein the identifier is associated with only a particular subset of entry blocks storing monitoring data of a particular thread; and computer usable code for performing, using a processor, an operation according to a function call recorded in an anchor block, wherein the function call is specified in another portion of the monitoring request on a part of the monitoring data accessible from a monitoring attribute in the set of monitoring attributes of the entry block, and wherein the function call performs one of (i) a monitoring operation, (ii) an analysis operation on the monitoring data, and (iii) a management of an entry block.

* * * * *